(12) United States Patent
Casillas et al.

(10) Patent No.: US 11,100,162 B2
(45) Date of Patent: *Aug. 24, 2021

(54) SYSTEMS AND METHODS FOR GENERATING PLAYLISTS IN A MUSIC SERVICE

(71) Applicant: Apple Inc., Cupertino, CA (US)

(72) Inventors: Charles Casillas, Oakland, CA (US); Chad West, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/418,650

(22) Filed: May 21, 2019

(65) Prior Publication Data

US 2019/0272286 A1    Sep. 5, 2019

Related U.S. Application Data

(63) Continuation of application No. 14/159,419, filed on Jan. 20, 2014, now Pat. No. 10,346,470.

(51) Int. Cl.
*G06F 17/30* (2006.01)
*G06F 16/60* (2019.01)
*G06F 16/68* (2019.01)
*G06F 16/638* (2019.01)

(52) U.S. Cl.
CPC ............ *G06F 16/60* (2019.01); *G06F 16/639* (2019.01); *G06F 16/68* (2019.01); *Y10S 707/916* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 2004/0141476 A1 | 7/2004 | Chumbley | |
| 2006/0195462 A1* | 8/2006 | Rogers | G06F 16/4393 |
| 2008/0256129 A1 | 10/2008 | Salinas | |
| 2009/0259606 A1 | 10/2009 | Seah | |
| 2011/0105182 A1 | 5/2011 | Sant | |
| 2012/0158531 A1 | 6/2012 | Dion | |
| 2012/0215684 A1* | 8/2012 | Kidron | G06F 15/167 705/39 |
| 2013/0288602 A1* | 10/2013 | Spencer | H04M 1/72561 455/41.2 |
| 2014/0115463 A1 | 4/2014 | Reznor | |

(Continued)

*Primary Examiner* — Hung D Le
(74) *Attorney, Agent, or Firm* — Blank Rome LLP

(57) ABSTRACT

Systems and methods for generating a playlist on a device for a user of a music service are provided. In embodiments, a method includes initiating an online mode of the music service, where the device is connected to a music service server, and storing, in a cache memory of the device, at least one media object accessed by the user using the music service. The method further includes identifying the at least one media object as satisfying a pre-designated condition, and in response, automatically adding the at least one media object to a playlist stored in the cache memory. The method also includes receiving an indication, via a user interface of the device, to initiate an offline mode of the music service, where the device is not connected to the music service server, and upon initiating the offline mode, enabling playback of the playlist from the cache memory.

20 Claims, 8 Drawing Sheets

(56) References Cited

U.S. PATENT DOCUMENTS

2014/0122589 A1* 5/2014 Fyke ................ H04N 21/41407
709/204
2014/0258292 A1* 9/2014 Thramann ............... G06F 16/48
707/736
2014/0282772 A1* 9/2014 Chen ................ H04N 21/42201
725/97

* cited by examiner

SYSTEMS AND METHODS FOR GENERATING PLAYLISTS IN A MUSIC SERVICE

FIELD

This application generally relates to automatically generating playlists for a user. In particular, the application relates to platforms and techniques for automatically generating playlists within a music service.

BACKGROUND

Music services are gaining in popularity as more consumers seek immediate access to comprehensive music libraries. For example, instead of purchasing individual copies of songs or albums (e.g., CDs), consumers can register with various music services to access music offered by the music services. Particularly, various music services and platforms enable users to download or stream specific songs, albums, or playlists to desktop applications or mobile devices. One benefit advertised by many music services is the ability to access music libraries where ever the user is located, so long as a network connection is available. However, there are deficiencies in existing music services and platforms.

For example, if the network connection falters or halts altogether, any music playing through the music service stops, and the music service's music libraries become inaccessible. This can be especially frustrating when the user will be without a network connection for an extended period of time, such as, for example, while travelling in a plane, working in a hospital or laboratory, or located at any other place with poor reception or a complete lack of connectivity. While some music services allow users to download music to the user's device and thereby, access the music independent of a network connection, this feature is useful only to the extent that the user remembers to download the music before the network connection is severed.

SUMMARY OF THE INVENTION

The application is defined by the appended claims. This description summarizes aspects of the embodiments and should not be used to limit the claims. While this description is stated in the context of music services, that is only one example implementation and other implementations are contemplated in accordance with the techniques described herein.

The application is intended to solve the above-noted business and technical problems by providing systems and methods for automatically generating playlists within a music service while a network connection is available and providing access to the automatic playlists when a network connection is not available. In embodiments, systems and methods are provided for generating a playlist on a device for a user of a music service is provided. According to an embodiment, a method includes initiating an online mode of the music service on the device, and storing, in a cache memory of the device, at least one media object accessed by the user using the music service. The method further includes identifying, using a processor, the at least one media object as satisfying a pre-designated condition, and responsive to the identification, automatically adding the at least one media object to a playlist stored in the cache memory. In addition, the method includes receiving an indication, via a user interface of the device, to initiate an offline mode of the music service, and upon initiating the offline mode, enabling playback of the playlist from the cache memory. During the online mode, the device may be communicatively coupled to a server affiliated with the music service, and during the offline mode, the device may not be communicatively coupled to the server.

According to another embodiment, a method for generating a playlist on a device for a user of a music service includes initiating, on the device, an online mode of the music service, and storing, in a cache memory of the device, at least one media object accessed by the user using the music service. The method further includes identifying, using a processor, the at least one media object as satisfying a pre-designated condition, and responsive to the identification, automatically adding the at least one media object to a playlist stored in the cache memory. The method also includes receiving an indication, via a user interface of the device, to initiate an offline mode of the music service, and upon initiating the offline mode, enabling playback of the playlist from the cache memory. During the online mode, the device is communicatively coupled to a server affiliated with the music service, and during the offline mode, the device is not communicatively coupled to the server.

BRIEF DESCRIPTION OF THE DRAWINGS

For a better understanding of the invention, reference may be had to embodiments shown in the following drawings in which.

DETAILED DESCRIPTION OF PREFERRED EMBODIMENTS

Figure 1:
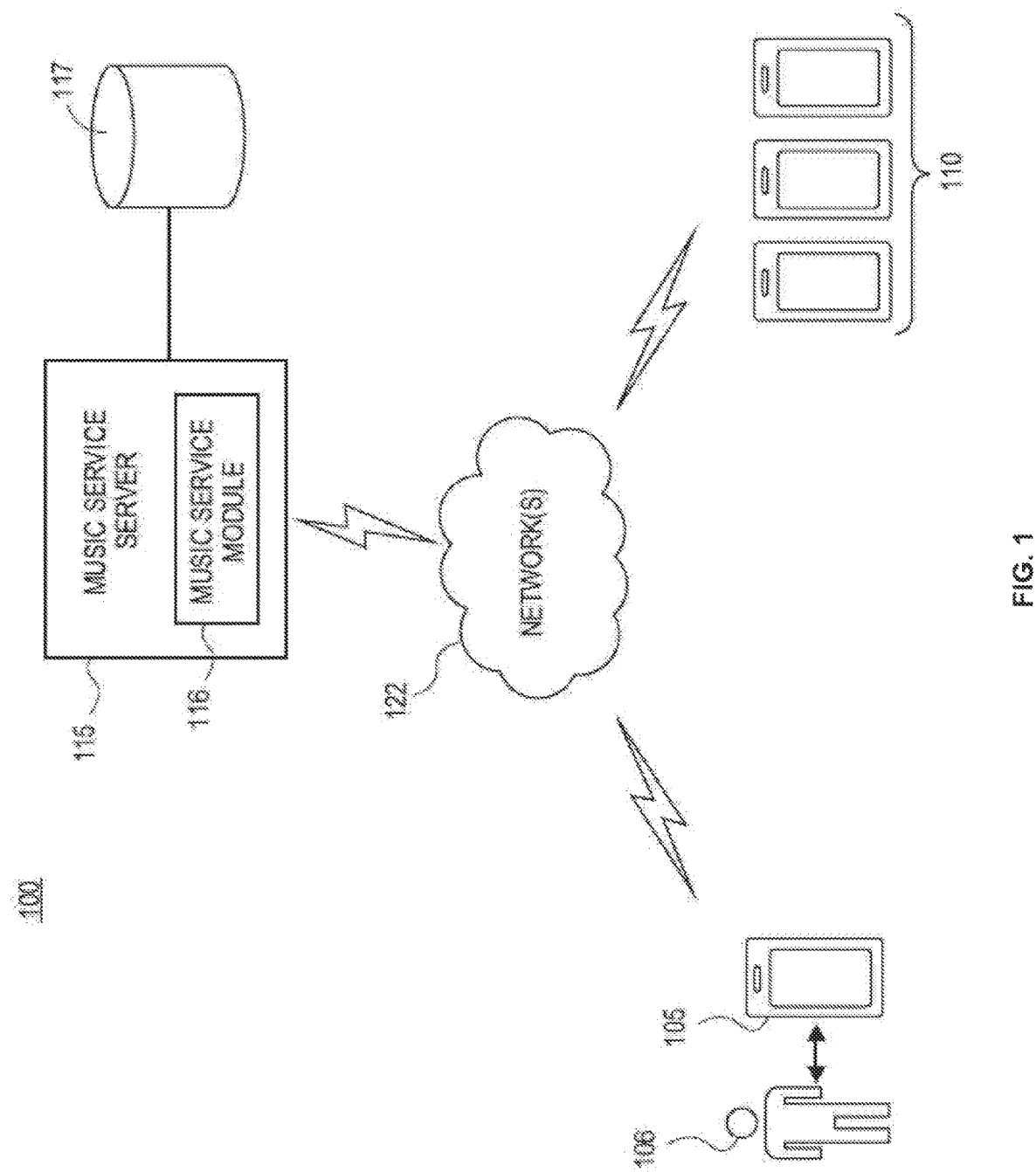
FIG. 1 is a block diagram illustrating an exemplary environment for implementing a music service, and/or portions thereof, in accordance with embodiments.

While the invention may be embodied in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

In accordance with one or more principles of the invention, systems and methods are provided for automatically generating a playlist while connected to a music service and providing access to the automatically-generated playlist when the music service is unavailable, the automatically-generated playlist including music files that were accessed through the music service and are temporarily stored in a local memory of the device. According to embodiments, an electronic device in combination with a music service server can implement the systems and methods that generate the playlists and provide access thereto. In embodiments, a user may access the music service through a music service application operating on the electronic device. According to aspects, the music service application may be configured to automatically cache, or temporarily download into a local memory, one or more music objects accessed using the music service, for example, via a streaming feature of the service. In embodiments, the music service application can automatically generate a playlist comprising one or more of the cached music files and store the playlist in the local or cache memory with a designation for "offline" access (e.g., when network communication with the music service server is not available). In this manner, the user can continue to have access to music, even if the music service application loses connection to the music service server, and even if the user does not actively download music to the device.

As used herein, a "music service" can be understood to be any service, platform, application, or the like that enables a set of users to access and manage media data, such as, e.g., media objects or music objects, among other functionalities. Further, as used herein, a "playlist" can be understood to be a listing, indication, or aggregation of one or more songs, tracks, albums, and/or other media data files or objects that are accessible to and manageable by one or more users, and from which the one or more users can select one or more songs for playback. In some cases, the media data files can be accessible locally to the device from which the user is accessing the playlist. In other cases, the media data files can be accessible via streaming from a remote server or from other devices connected to the device via a network. According to present embodiments, the music service enables users to share music with each other. In some embodiments, the set of users can register with the music service.

It should be understood that any music object sharing, identifying, determining, locating, retrieving, providing or the like can be facilitated by an electronic device singularly, or by the electronic device in communication with a server, such as a music service server. For example, the electronic device (e.g., smartphone, tablet computer, notebook computer, etc.) can request a server to locate one or more songs. Further, the server can provide any located songs to the electronic device for playback by a user. Further, both the electronic device and the server can execute a music service or similar music service module or application to implement the functionalities as discussed herein.

FIG. 1 depicts an environment 100 comprising components and entities of the embodiments as discussed herein. It should be appreciated that the environment 100 is merely exemplary and can comprise fewer or more components and entities, as well as other various combinations of components and entities.

As shown in FIG. 1, the environment 100 comprises a device 105 configured to communicate with a music service server 115. In embodiments, it should be understood that the device 105 can be any type of device such as, for example, a smart phone, a notebook or desktop computer, a tablet device, a personal data assistant (PDA), or the like, comprising any type of hardware or software components, or combinations thereof. The device 105 can execute a music service application 107 configured to facilitate the functionalities as discussed herein. As shown in FIG. 1, a user 106 can interface with the device 105 and/or the music service application 107 thereof to manage various functionalities associated with the components of the environment 100. The music service server 115 can comprise a combination of hardware or software components (such as a music service module 116), or combinations thereof, configured to support the facilitation of a music service, as well as the techniques for determining personal preferences as described herein. In some embodiments, the user 106 of the device 105 can register for an account or a registration with an associated music service and the music service server 115 and components thereof can provide music data or objects to the device 105 in accordance with a subscription of the user 106. For example, in some cases, the user 106 can select to download songs, tracks, and/or other music objects from the music service server 115 to the device 105. In other cases, the music service server 115 can stream songs, tracks, playlist files including songs, and/or other music objects to the device 105 for access and consumption by the user 106.

In embodiments as shown, the music service server 115 can couple to storage 117 that can be configured to store data associated with the music service server 115. For example, the storage 117 can store any associated music data as well as data related to subscriptions and other account information for users of the music service server 115. The device 105 can connect to the music service server 115 via a network 122 such as, for example, a wide area network (WAN), a local area network (LAN), or other networks. The network 122 can facilitate any type of wireless data communication via any wireless communication standard or technology (e.g., GSM, CDMA, TDMA, WCDMA, EDGE, OFDM, GPRS, EV-DO, WiMAX, WiFi, Bluetooth, UWB, and others). More particularly, the device 105 can send data to and receive data from the music service server 115 via the network 122. For example, the music service server 115 can receive music data requests from the device 105 and can transmit or stream music data to the device 105 according to the requests.

As shown in FIG. 1, the environment 100 can further comprise a set of additional devices 110 that can also be configured to connect to the music service server 115 via the network 122. Each of the set of additional devices 110 can be associated with a set of additional users of the music service implemented by the music service server 115. More particularly, each of the set of additional users can have an associated account with the music service or can otherwise register with the music service. In embodiments, the device 105 can be configured to connect to and/or exchange data with the set of additional devices 110 via the network 122. Any of the additional devices 110 can send music data to the device 105 and/or to any of the remaining additional devices 110 via the network 122.

According to implementations, the music service server 115, the device 105, and the set of additional devices 110, and components thereof, can facilitate the management of music subscriptions of the users of the respective devices 105, 110. More particularly, the music service server 115 (and the music service module 116 thereof), the device 105 (and the music service application 107 thereof), and/or the set of additional devices 110 can enable the respective users to share music objects with each other. It should be appreciated that the music objects, as described herein, can be any type of music data and information such as, but not limited to, one or more songs, one or more albums, a group of songs by a particular artist, one or more playlists, one or more music videos, various music artwork, and/or other types of media of data.

Users of the device 105 and/or the set of additional devices 110 can interface with respective devices 105, 110 to initiate a music service or application and manage the functionalities of the music service. The device 105 and/or the set of additional devices 110 can communicate with the music service server 115 to transmit share activity, identify music objects based on the share activity, and access the music objects. In embodiments, a user can select to play a music object, at which point the music service server 115 can retrieve the appropriate music object from the storage 117 and provide (e.g., by streaming) the music objects to the appropriate device 105, 110. In some embodiments, one or more of the music objects can be played from a local memory (e.g., local cache, disk cache, system cache, etc.) of the appropriate device 105, 110. In further embodiments, one or more of the music objects can be retrieved via a peer-to-peer (P2P) network among the device 105 and the set of additional devices 110.

According to embodiments, the user 106 can be "connected" to or "following" other users (such as users of the additional devices 110) via a social feature of the music service. In some cases, some of the "connections" can be mutual whereby if User A is connected to User B, then User B is connected to User A. In other cases, some of the connections can be one-directional whereby if User A is following User B, then User B is not necessarily following User A. The social feature can enable users to share music objects with additional users of the music service, such as a particular user sharing a music object with one or more connections or followers. In embodiments, one or more users can belong to a certain group or other type of aggregation of users. It should be appreciated that other types of connections, followings, and groups among users are envisioned. According to aspects, the social feature of the music service enables users to effectively and efficiently share music and other media with other users and groups of users.

According to embodiments, each user of the music service can have an associated music profile that can include any data related to the musical tastes, preferences, listening history, interactions or social network connections with artists and/or other users, listening data or trends, songs or artists that share similarities with other songs or artists that the user enjoys, has listened to, and/or is otherwise associated with the user, and/or any other data that can indicate the songs, bands, artists, genres, and/or musical eras that a user tends to enjoy or not enjoy. In embodiments, the music profile of the user can be based on other users, entities, or music or playlist curators that the user is connected to, "follows," subscribes to, or is otherwise associated with in the music service. In some embodiments, the music profile may include a preferred list (also referred to herein as "favorites list") that identifies each song, album, artist, playlist or other music object for which the user has indicated a preference. For example, in embodiments, the user may indicate a song preference by selecting a preferred option (e.g., "love it," "like it," "favorite," etc.) associated with the song via a user interface associated with the music service application (such as, e.g., "love it" option 815 shown in FIG. 9).

Figure 4:
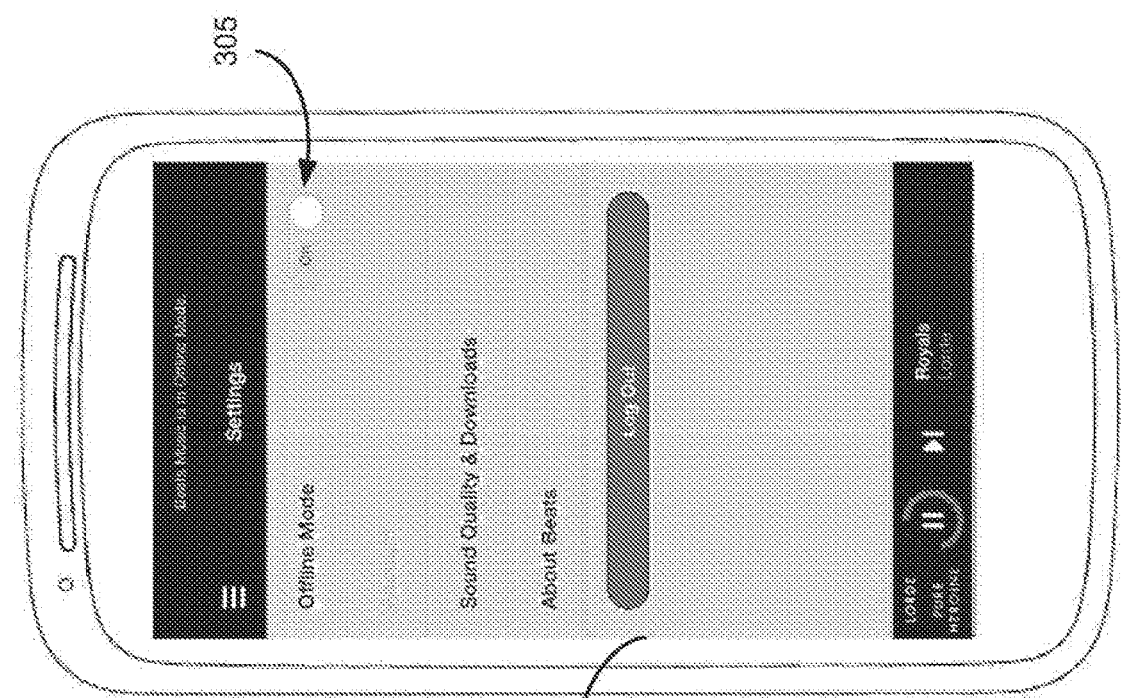
FIGS. 3-9 illustrate exemplary interfaces associated with a music service application, in accordance with embodiments.
Figure 3:
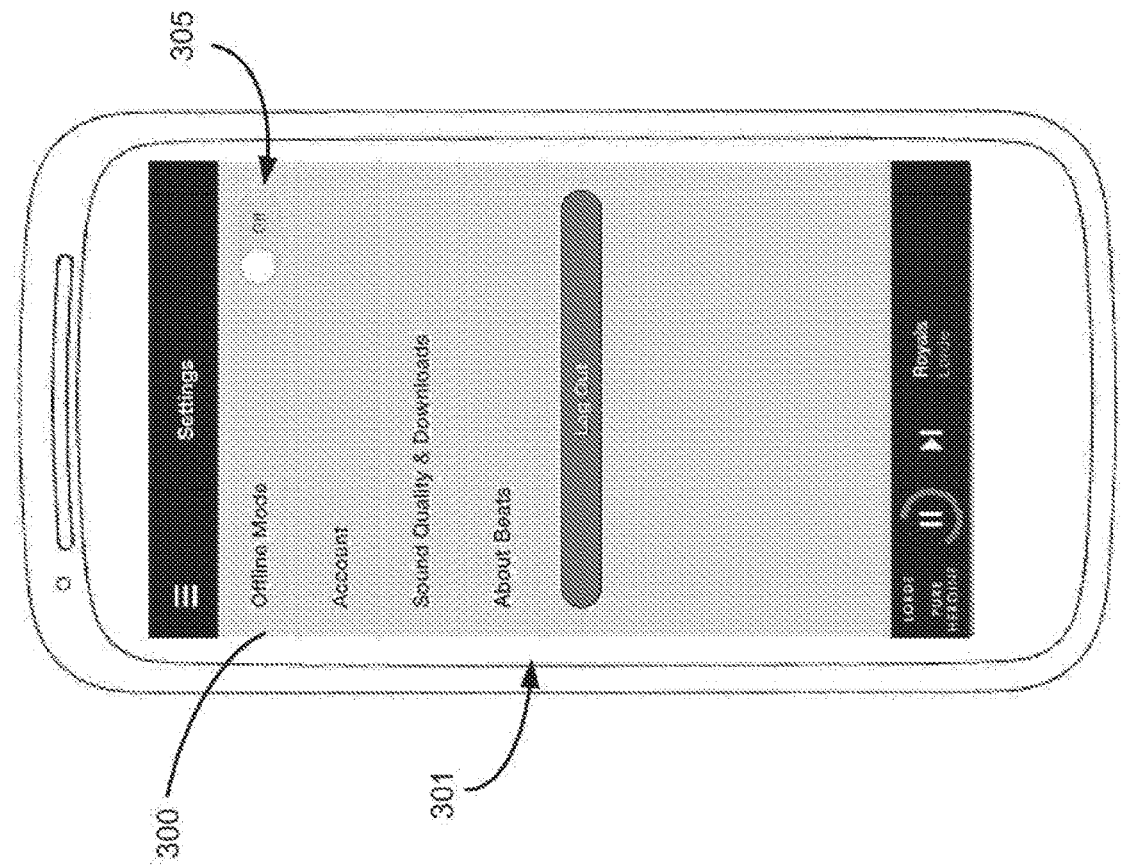

In some embodiments, the music service application and/or the electronic device can be operable in one of an "online mode" and an "offline mode." The online mode may be initiated when network communication with the music service and/or the music service server is available. Conversely, the offline mode may be initiated when network communication with the music service and/or music service server is unavailable. In some embodiments, the online mode and/or offline mode are automatically selected by the music service application and/or the electronic device, depending on a status of the network connection. In other embodiments, a user may select between the online mode and the offline mode using a graphical user interface associated with the music service application (e.g., as shown in FIGS. 3 and 4). In some cases, the user may select the offline mode even though a network connection is available, for example, in order to avoid cellular data usage or limit the user's listening options to the music content specifically available offline.

In embodiments, the music service application may present different options, content, and/or functionality depending on whether the application is operating in the online mode or the offline mode. For example, the music service application may include an online version of the application that provides full access to the music service and the application's functionality (e.g., create playlists, browse music libraries, access featured playlists, albums, artists, and other music content provided by the music service, etc.). In embodiments, the online version may be a default version of the application and/or may appear whenever the application is in the online mode. In addition, the music service application may include an offline version that appears when the application is in the offline mode. In embodiments, the offline version of the application may provide access to songs, albums, playlists, and other music content that the user previously downloaded to the local memory of the device or otherwise marked for offline access. According to preferred embodiments, the offline version provides access to playlists that were automatically generated by the music service application and/or the device for offline access, as described herein. As will be appreciated, the offline version of the application may not provide content or functionality that requires network communication with the music service. In embodiments, when the music service application returns back to the online mode, the online version of the application also reappears.

In embodiments, the music service and/or the music service application may include one or more aspects for facilitating the automatic generation of playlists comprising music objects cached in the local memory of the device 105 and for enabling access to the automatically generated playlists during the offline mode of the music service application. As used herein, the term "local memory" may refer to any type of memory that is capable of being used for temporary data storage, including, for example, a local cache, a system cache, a disk cache, a random access memory (RAM), or a cache memory. In some embodiments, the device 105, 110 may store different categories of data in separate memory locations. For example, music objects that are downloaded from the music service, or otherwise designated for offline access, by the user may be stored in one memory (e.g., an offline cache), and music objects that are automatically downloaded or cached by the device 104, 110 may be stored in a second memory (e.g., a system cache). In embodiments, music objects may be cached or temporarily downloaded to the local memory for a number of reasons, including, for example, conserving bandwidth by keeping frequently played songs readily-available, decreasing downtime or "dead air" between the end of one song and the beginning of the next song, or any other reason known in the art for caching music files during access to a streaming music service.

Figure 2:
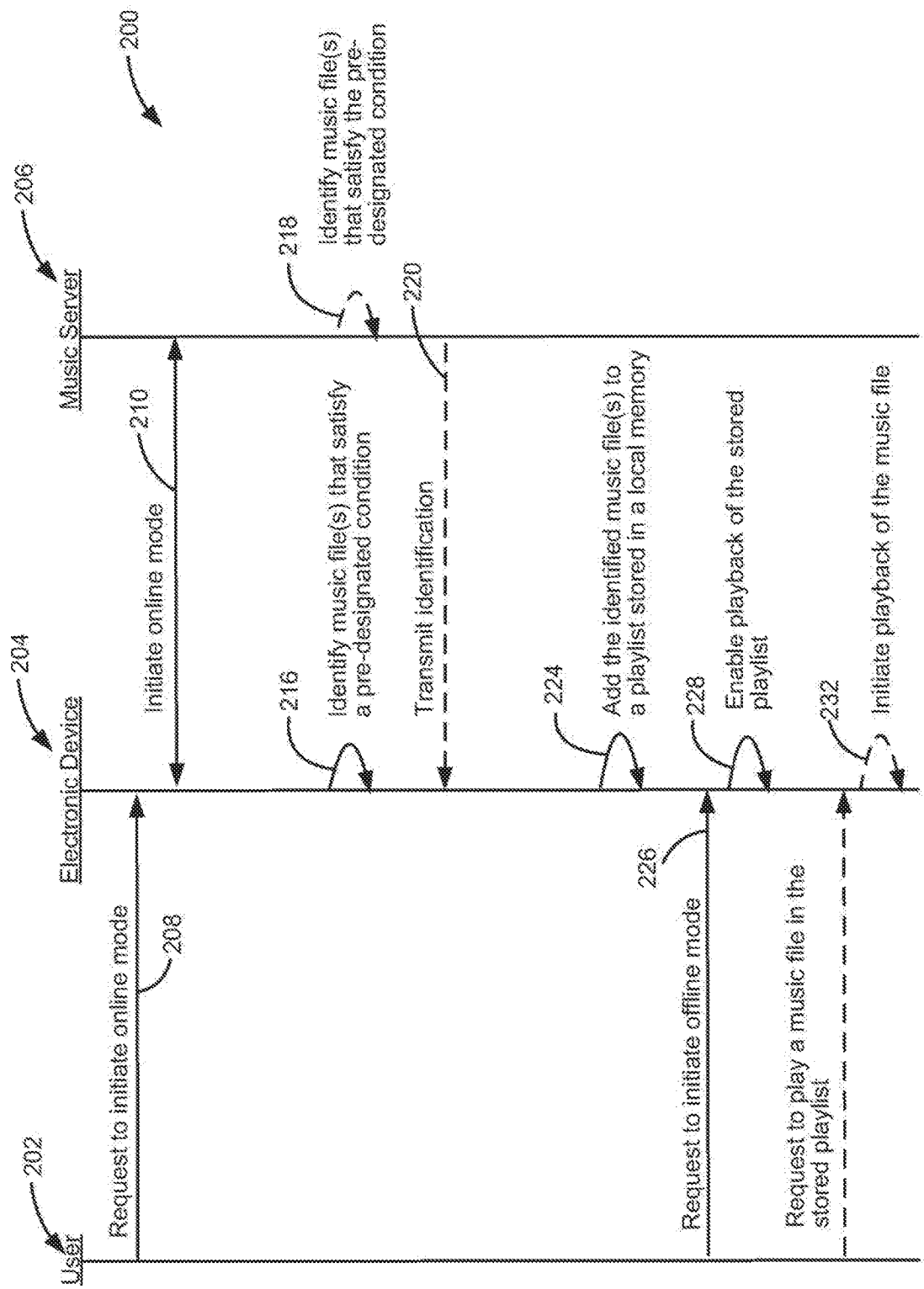
FIG. 2 is a diagram illustrating various functionalities associated with generating playlists using a music service, in accordance with embodiments.

FIG. 2 depicts a sequence 200 of interactions between a user 202 of a music service (such as, e.g., the user 106 discussed with respect to FIG. 1), an electronic device 204 (such as, e.g., the device 105 discussed with respect to FIG. 1), and/or a server 206 (such as, e.g., the music service server 115 discussed with respect to FIG. 1) in accordance with embodiments. In some embodiments, the sequence 200 may be associated with a method for automatically generating playlists that can be available for offline access. For example, the electronic device 204 and/or the server 206 may implement the functionalities depicted and described herein by executing an application on the device 204 and/or the server 206. In some embodiments, the device 204 may implement relevant portions of the sequence 200 may executing the application and interfacing with the server 206. In embodiments, the application may be the music service application or a portion thereof, such as an automatic playlist generation aspect of the application. In embodiments, the application may be a computer program stored on a non-transitory computer readable medium that is executable by a processor of the device. The device 204 and the server 206 may be communicatively coupled via a network connection (e.g., an Internet connection). The user 202 may interact with the device 204 through a user interface (e.g., a touchscreen) of the device 204. Although FIG. 2 is described with respect to playing music files or songs, it should be appreciated that other types of music objects (e.g., playlists, albums, artists, etc.) can be similarly involved in the sequence 200.

As illustrated, the sequence 200 includes the user 202 entering a request to initiate an online mode (208) of the music service via the user interface of the electronic device 204. In response to the online request 208, the device 204 communicates with the server 206 to gain access to the music service and thereby, initiates the online mode (210). In some cases, the online request 208 may be sent automatically in response to the user 202 logging into the music service and/or the music service application on the device 204. In other cases, the online request 208 may be sent in response to a manual input entered by the user 202, such as, e.g., selecting a "go online" option via the user interface (e.g., by turning off an offline mode option 405 in FIG. 5).

Once connected to the music service in the online mode, the user 202 can browse and select music files from the music service via the user interface of the device 204 and playback selected music files via a speaker of the device 204. When streaming a selected music file from the music service server 206, the music file may be cached simultaneously with, or at least partially overlapping, playback of the selected file. For example, upon receiving a request to play a selected music file, the device 204 may begin downloading the requested music file from the server 206 and playing the downloaded portion of the file via the speaker. Typically (e.g., if the network connection is sufficiently fast), the device 204 can download the music file in its entirety before playback is complete. While playback catches up, the device 204 can cache the downloaded portion of the music file in the local memory of the device 204 (e.g., the local cache or system cache). In embodiments, the device 204 may cache incoming music files to provide faster access to requested data. For example, if a given music file was previously cached, the next time the file is requested, device 204 can access the music file directly from the local memory, rather than requesting the file from the server 206.

In embodiments, the stored music files may be removed or deleted from the local memory at regular time intervals, upon reaching a storage capacity of the local memory, after playback has completed, or at any other time specified by a cache management plan for the music service application and/or the device 204. For example, in some embodiments, a preset amount of the local memory may be allocated or designated for caching music files (e.g., two gigabytes (GB), one GB, etc.). In other embodiments, a dynamic amount of the local memory may be allocated, for example, by designating a percentage of the available storage capacity for caching music files (e.g., ten percent, twenty percent, etc.). As another example, in embodiments, each music file may be assigned a timestamp upon caching the music file, and music files having a timestamp older than a threshold date and/or time can be automatically deleted or removed from the local memory. In yet another example, cached music files for which the user indicates a dislike or negative preference (e.g., selection of "hate it" option 816 in FIG. 9) may be automatically removed from the local memory.

In some embodiments, the music service application may pre-cache music files in anticipation of the next request, for example, by downloading, and storing in the local memory, songs that are expected to be played next. For example, when the user begins playing a song from within an album or playlist, the music service application may begin pre-caching a preset portion of the album or playlist, such as, for example, a number of sequentially occurring songs (e.g., the next three or four songs), an amount of sequential playback time (e.g., the next twenty or thirty minutes of playback), or an amount of sequentially-organized data (e.g., the next 500 megabytes (MB)). In some embodiments, pre-cached music files may be automatically deleted from the local memory if the user indicates a lack of interest in the files and/or the associated album or playlist, for example, by switching to a different album or playlist.

In embodiments, while in the online mode, the device 204 may communicate with the server 206 in order to report information related to songs accessed using the device 204, such as, for example, listening history (e.g., whether the user completed playback of the song or skipped to another song, the number of times the user has requested playback of that song, etc.), preference information (e.g., whether the user indicated a preference or a dislike for the song), and social interaction information (e.g., whether the user shared the song with other users on the music service). The music service may add this song information to the user's music profile, which may be stored at the server 206.

Referring back to the sequence 200 in FIG. 2, in some embodiments, the device 204 can identify (216) whether music files accessed by the user 202 satisfy a pre-designated condition associated with the music service application's feature of automatically generating playlists available for offline access. In other embodiments, the server 206 may perform the identifying (218) and transmit the identification of the music file to the device 204. In some embodiments, the identification 216/218 only involves music files that are already stored in the local memory of the device 204. For example, the device 204 and/or the server 206 may identify which of the currently-cached music files satisfy the pre-designated condition. In other embodiments, the identification 216/218 can involve any music file accessed by the user through the music service.

In embodiments, the pre-designated condition includes receipt of a user preference for, and/or a user selection of, a given song, album, playlist, or other music object. For example, the pre-designated condition may include receipt of at least one of: an indication from the user to playback the music file, a playback request for the music file within a recent time period (e.g., in the past twenty-hour hours, in the past week, etc.), an indication to add the music file to the user's preferred list, an indication with the recent time period to add the music file to the user's preferred list, a threshold number of playback requests for the music file, or a threshold number of playback requests for the music file within the recent time period. In some embodiments, the music service application may be configured to identify (216) music files that satisfy at least one of a plurality of pre-designated conditions. In other embodiments, the music service application may be designed for identification (216) based on one pre-designated condition, such as, e.g., receipt of a playback request within the recent time period.

In embodiments, the device 204 and/or the server 206 may automatically identify music files meeting the pre-designated condition at predetermined time intervals, in response to each playback request, preference indication, or other action by the user, or based on a variety of other factors. For example, the device 204 and/or the server 206 may search every two minutes for music files satisfying the pre-determined condition. As another example, the device 204 and/or the server 206 may identify each music file played by the user as satisfying the pre-designated condition. In some embodiments, the device 204 and/or the server 206 may also identify music files that no longer meet the pre-designated condition. For example, a music file that has not been played within the recent time period may be deleted from the local memory and consequently, removed from the list of identified music files.

Referring back to the sequence 200 shown in FIG. 2, in embodiments, the device 204 can automatically add (224) the identified music files to an automatically-generated playlist stored in the local memory of the device 204. The automatically-generated playlist may become accessible when the music service application is in the offline mode, for example, through the offline version of the application. In embodiments, the automatically-generated playlist can be "dynamic," since the contents of the playlist may be continuously updated as music files are added, or removed from, the local memory. For example, any new music files identified (216/218) as satisfying the pre-designated condition may be automatically added to the playlist. As another example, music files that no longer satisfy the pre-designated condition may be automatically removed from the playlist. In some embodiments, music files may also be removed from the playlist upon reaching a preset content limit, such as, e.g., a preset number of songs (e.g., twenty songs, twenty-five songs, etc.), a preset amount of play time (e.g., twenty minutes, thirty minutes, etc.), and/or a preset amount of disk space (e.g., two gigabytes (GB)). In some embodiments, the preset content limit may be defined by an available storage capacity of the local memory.

In some embodiments, the identified music files are previously-cached files stored in the local memory (e.g., where the identified files are songs that have been played within a recent time period). In other embodiments, the identified music files may be downloaded to the local memory from the music service server 206 prior to adding the files to the playlist (e.g., as described with respected to FIG. 11). For example, in some cases, the identified files may be songs for which the user has indicated a preference but are no longer stored in the local memory (e.g., because the files have not been played within the recent time period). In such cases, in response to the identification 216/218, the identified music files may be downloaded to the local memory and then added to the automatically-generated playlist.

Referring back to the sequence 200, in embodiments, the user can request (226) to initiate the offline mode of the music service application via the user interface of the device 204 (e.g., by selecting the on position of offline mode option 305 in FIG. 4). In response to the offline request 226, the device 204 can enable (228) access to the automatically-generated playlist, as well as any other features associated with the offline version of the music service application (e.g., turn off any network-related functions, present music content available for offline access, etc.). For example, upon initiating the offline mode, the music service application may present the automatically-generated playlist to the user and display an option to initiate playback of the stored playlist (e.g., play option 511 in FIG. 6). In embodiments, the user 202 can request (230) to play a music file included in the automatically-generated playlist using the user interface of the device 204. In response to the playback request 230, the device 204 can initiate (232) playback of the requested music file from the local memory. Alternatively, the user 202 can request to play the entire playlist, through the user interface, and in response, the device 204 can initiate playback of a first song include in the playlist.

FIGS. 3-9 illustrate exemplary interfaces associated with the execution, facilitation, and implementation of an aspect of the music service designed to automatically store, in a temporary memory of a user device, a playlist comprising cached music objects accessed by the user during an online mode of the music service, the stored playlist being made accessible during an offline mode of the music service. More particularly, FIGS. 3-9 illustrate screenshots of exemplary graphical user interfaces associated with a cached playlist generation aspect of the music service application executing on an electronic device. The exemplary interfaces can be displayed on displays of devices of the users of the music service, such as the device 105 and the additional devices 110. The devices can be configured to execute the music service application, and the interfaces of the music service application enable the users to provide input associated with various functionalities. The data associated with the exemplary interfaces can be transmitted to, received from, and/or synchronized with a server, such as the music service server 115.

The users can interface with the music service application via a user interface of the devices, such as a touchscreen 301, as illustrated in FIG. 3. The exemplary interfaces can be displayed on the touchscreen 301, which includes contact-sensing technology configured to sense or detect user contact on the touchscreen 301 and to send one or more signals indicating detection of a contact-based input to a processor (e.g., processor 1014 in FIG. 10) executing the music service application. It should be appreciated that the interfaces of FIGS. 3-9 are merely exemplary and can comprise other various details, arrangements, and/or selectable options.

FIG. 3 depicts a screenshot of an exemplary settings interface 300 associated with the music service application. The interface 300 can appear upon selecting a settings option (e.g., settings option 403 in FIG. 5). In FIG. 3, the settings interface 300 is being accessed while the music service application is operating in the online mode, e.g., in the online version of the application. This is indicated by the "off" position of an offline mode option 305 included in the interface 300. FIG. 4 depicts the settings interface 300 with the offline mode option 305 in the "on" position to indicate that the music service application is operating in the offline mode. In embodiments, the user may toggle between the online mode and the offline mode by selecting off or on, respectively, at the offline mode option 305.

Figure 5:
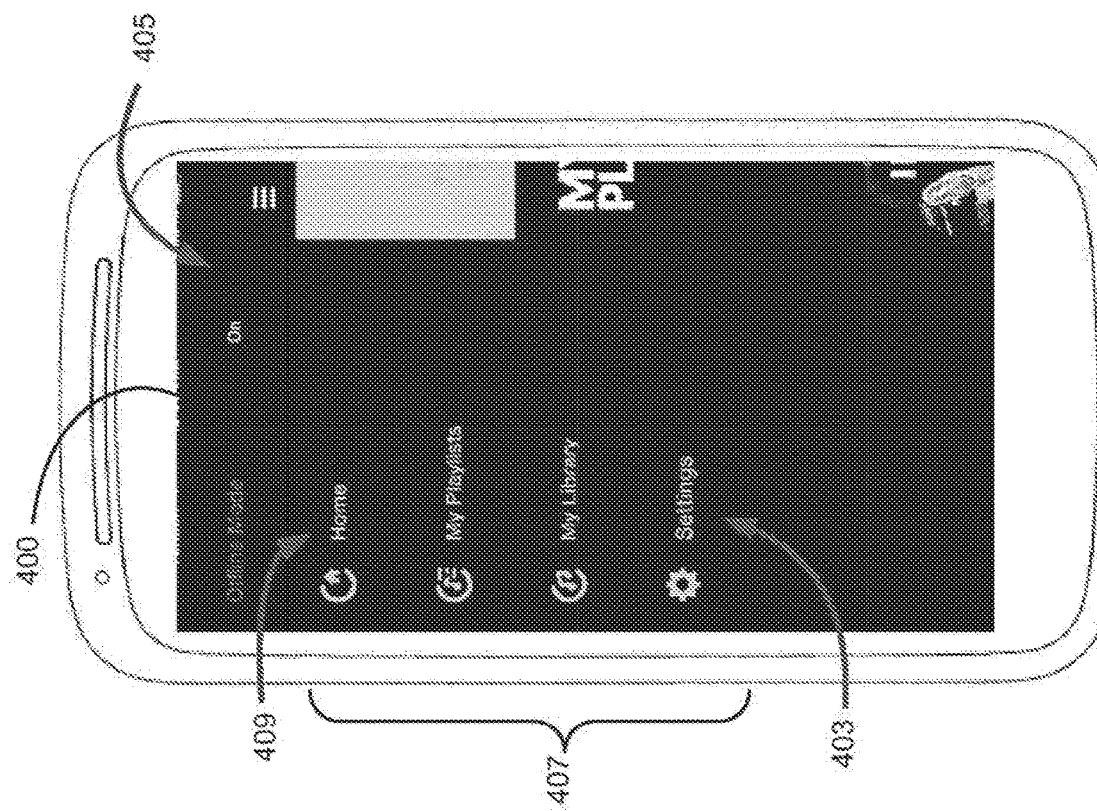

FIG. 5 depicts a screenshot of an exemplary navigation interface 400 associated with the music service application. The navigation interface 400 includes a list of navigational options 407 for guiding the user through the offline version of the music service application. For example, the navigational options 407 include the settings option 403 for accessing the settings interface 300 shown in FIG. 4. As illustrated, the navigational options 407 also includes a home option 409 for taking the user to a home page or initial page (such as, e.g., interface 500 in FIG. 6) of the offline version of the application. The interface 400 also includes an offline mode option 405 for activating (e.g., "on"), or deactivating (e.g., "off"), the offline mode. In the illustrated embodiment, the offline mode option 405 is in the on position, indicating that the offline mode is active.

Figure 6:
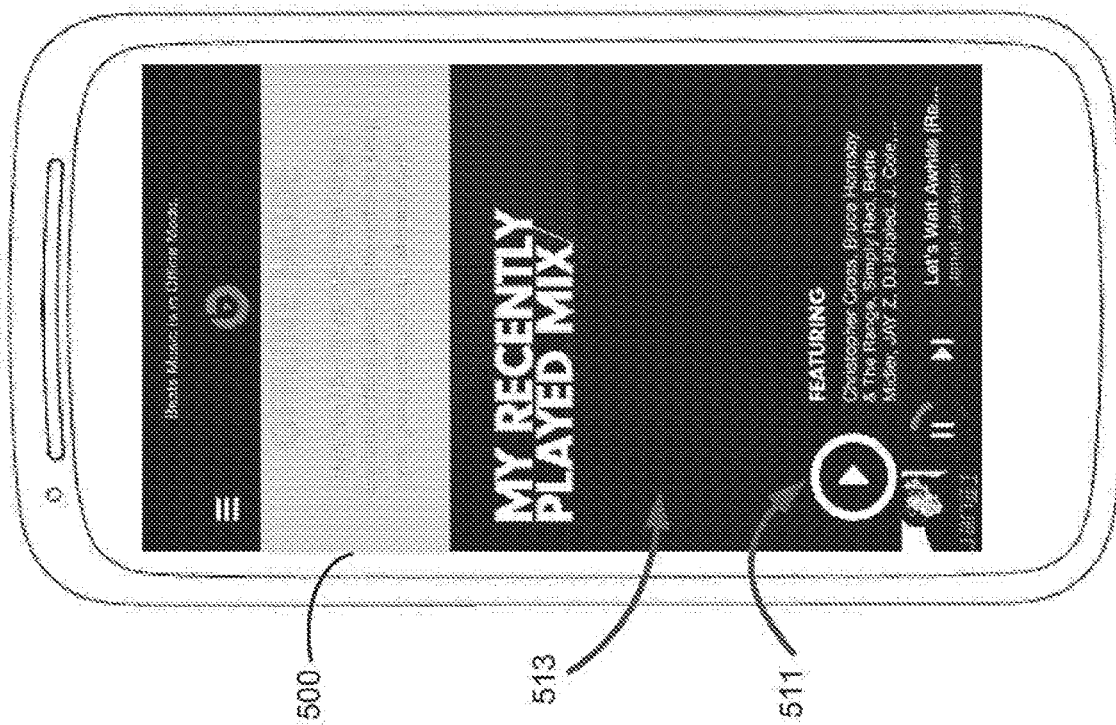

FIG. 6 depicts a screenshot of an exemplary navigation interface 500 associated with the offline version of the music service application. As illustrated, the interface 500 presents the user with access to music downloaded from the music service or otherwise designated to be available offline, as well as an additional content, such as, e.g., an automatically-generated playlist. In embodiments, this playlist can be automatically generated by the music service application to include cached music files as described herein, for example, with respect to the sequence 200 of FIG. 2. In embodiments, the interface 500 can include a select playlist option 513 and a play option 511 that enables the user to play the entire playlist. In the illustrated embodiment, the select playlist option 513 includes a graphical depiction representing the automatically-generated playlist and the title of the playlist. In some embodiments, the graphical depiction may include album artwork, a photograph of an artist, or other imagery associated with the music files included in the playlist.

In the illustrated embodiment, the automatically-generated playlist is presented with the title "My Recently Played Mix" and includes, for example, songs or music files selected for playback within a recent or predetermined time period (e.g., within the last day, the last week, the last month, etc.). Other automatically-generated playlists associated with other pre-designated conditions are also contemplated according to the principles disclosed herein. For example, in some embodiments, the automatically-generated playlist may be a "frequently-played mix" that includes music files played by the user at least a threshold number of times (e.g., at least twenty times). As another example, the automatically-generated playlist may be a "recent favorites mix" that includes music files that have been added to the user's preferred list within a recent time period (e.g., in the past week). In yet another example, the automatically-generated playlist may be an "all-time favorites mix" that includes all of the music files in the user's preferred list.

Figure 7:
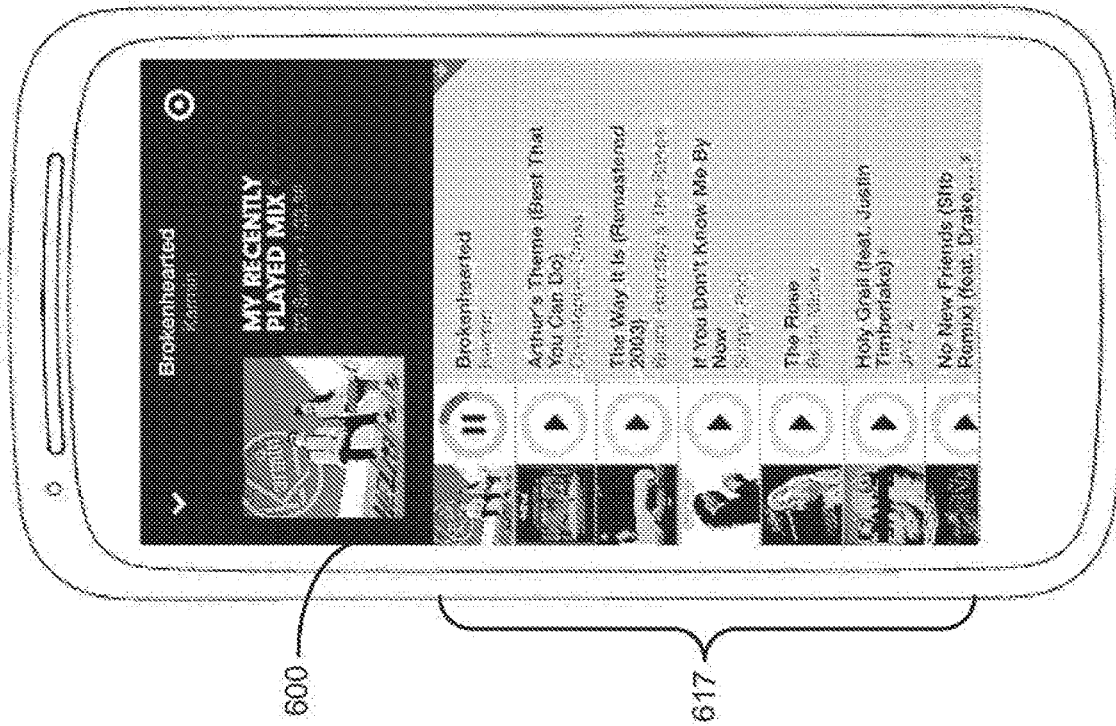

FIG. 7 depicts a screenshot of an exemplary interface 600 associated with the offline version of the music service application. As illustrated, the interface 600 includes a track listing 617 that identifies each song or track included in the playlist entitled "My Recently Played Mix." In embodiments, the interface 600 may appear upon user selection of the select playlist option 513 on the interface 500. While the track listing 617 shown in FIG. 7 only shows seven songs, it will be appreciated that the track listing 617 may include more songs. For example, the track listing 617 may extend beyond the screenshot shown in FIG. 7 and may be fully accessed by scrolling up or down in the interface 600, thereby displaying any additional songs.

Figure 9:
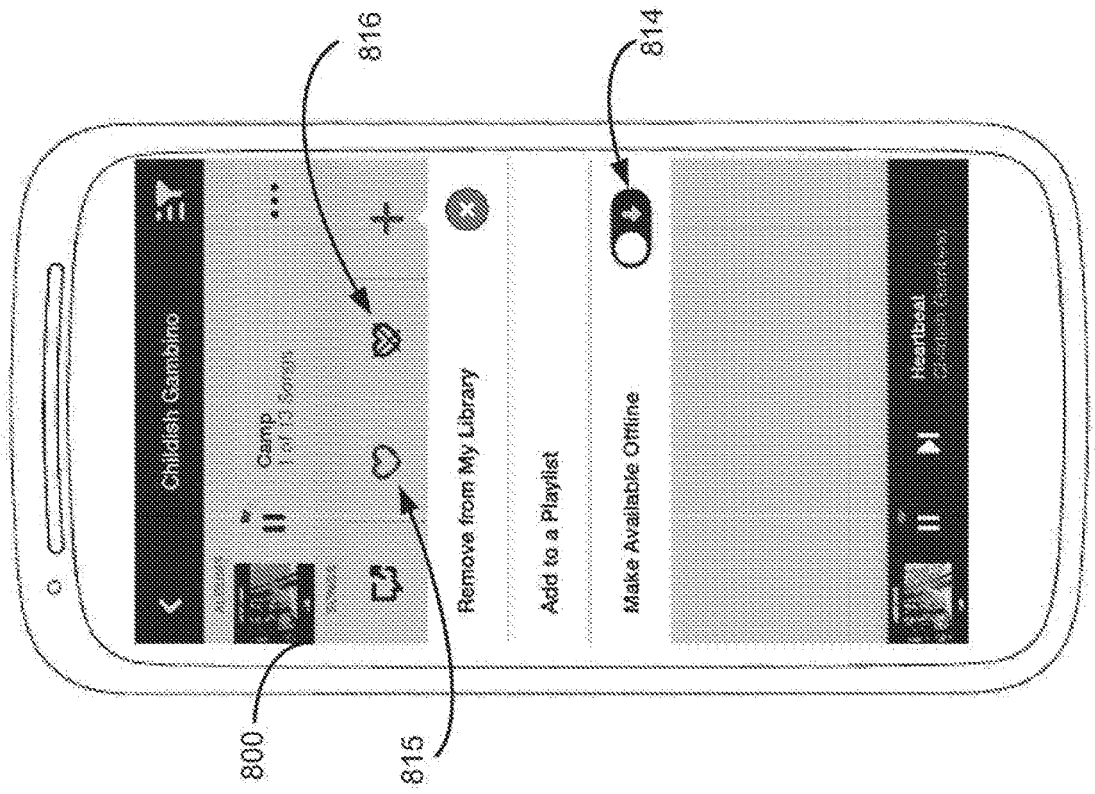
Figure 8:
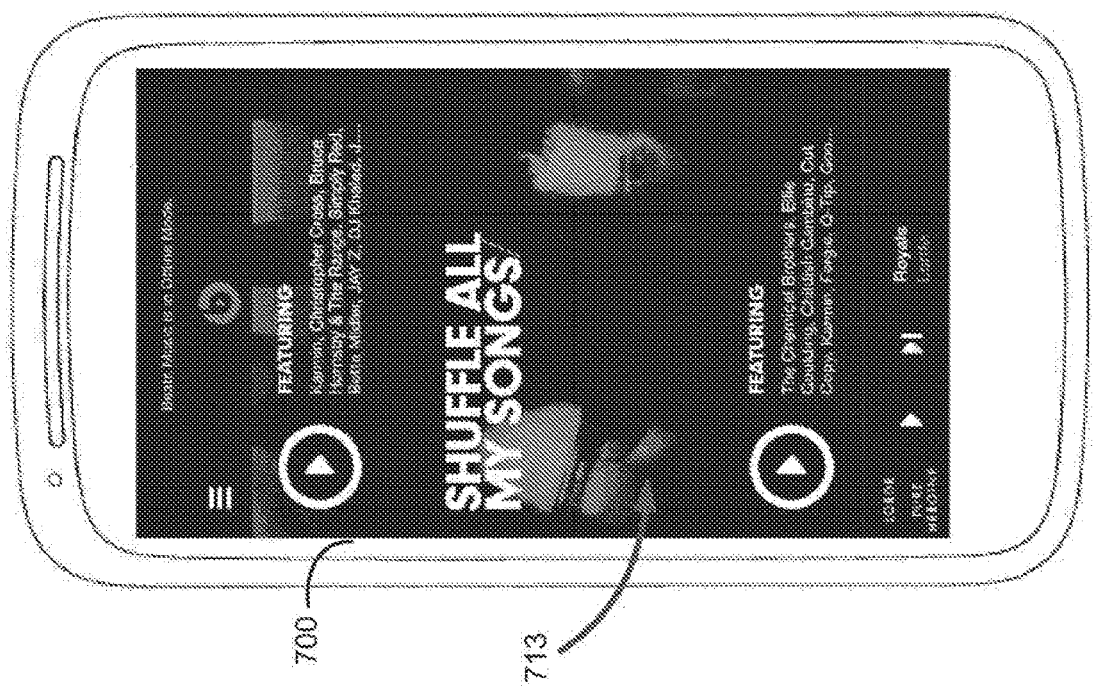

FIG. 8 depicts a screenshot of an exemplary graphical user interface 700 associated with the offline version of the music service application. As illustrated, the interface 700 includes a select playlist option 713 associated with a playlist entitled "Shuffle All My Songs." The illustrated playlist may include songs or music files that were designated for offline access by the user during the online mode of the music service application. For example, FIG. 9 depicts an exemplary graphical user interface 800 that is associated with the online version of the music service application and includes a "make available offline" option 814 for marking a selected music object (e.g., song, album, or playlist) for offline access. Upon selection of the make available offline option 814, the selected music object may be downloaded to a location within the local memory reserved for user-initiated downloads (e.g., the offline cache). The music objects stored in this location may be automatically added to the Shuffle All My Songs playlist shown in FIG. 8 and made accessible when using the offline version of the music service application.

The interface 800 shown in FIG. 8 further includes a "love it" option 815 for indicating a positive preference or love for a selected music object and/or adding the music object to the preferred list included in the user's music profile. The interface 800 further includes a "hate it" option 816 for indicating a negative preference or dislike for a selected music object and/or adding the music object to a hated list included in the user's music profile. In embodiments, music objects in the hated list may be excluded from any playlists or music suggestions proffered to the user by the music service. In embodiments, user selection of any of the options 814, 815, or 816 may be transmitted to the music service server via the network connection (e.g., while in the online mode) and recorded in the user's music profile. In some embodiments, the interface 800 may also be associated with the offline version of the music service application, and user selection of any of the options 814, 815, or 816 may be temporarily stored in the local memory until the online mode is re-initiated and/or a network connection is restored. Upon connecting to the music service server, the stored user selections may be transmitted or reported to the server in one or more batches and recorded in the user's profile. Likewise, in some embodiments, while in the offline mode, the user's listening history may be recorded and stored in the local memory, and once the online mode is re-initiated, the offline listening history may be sent to the music service server and added to the user's music profile. In this manner, for example, upon re-entering the online mode of the music service application, the My Recently Played Songs playlist may be automatically updated based on the songs played and/or "loved" while in the offline mode.

Figure 10:
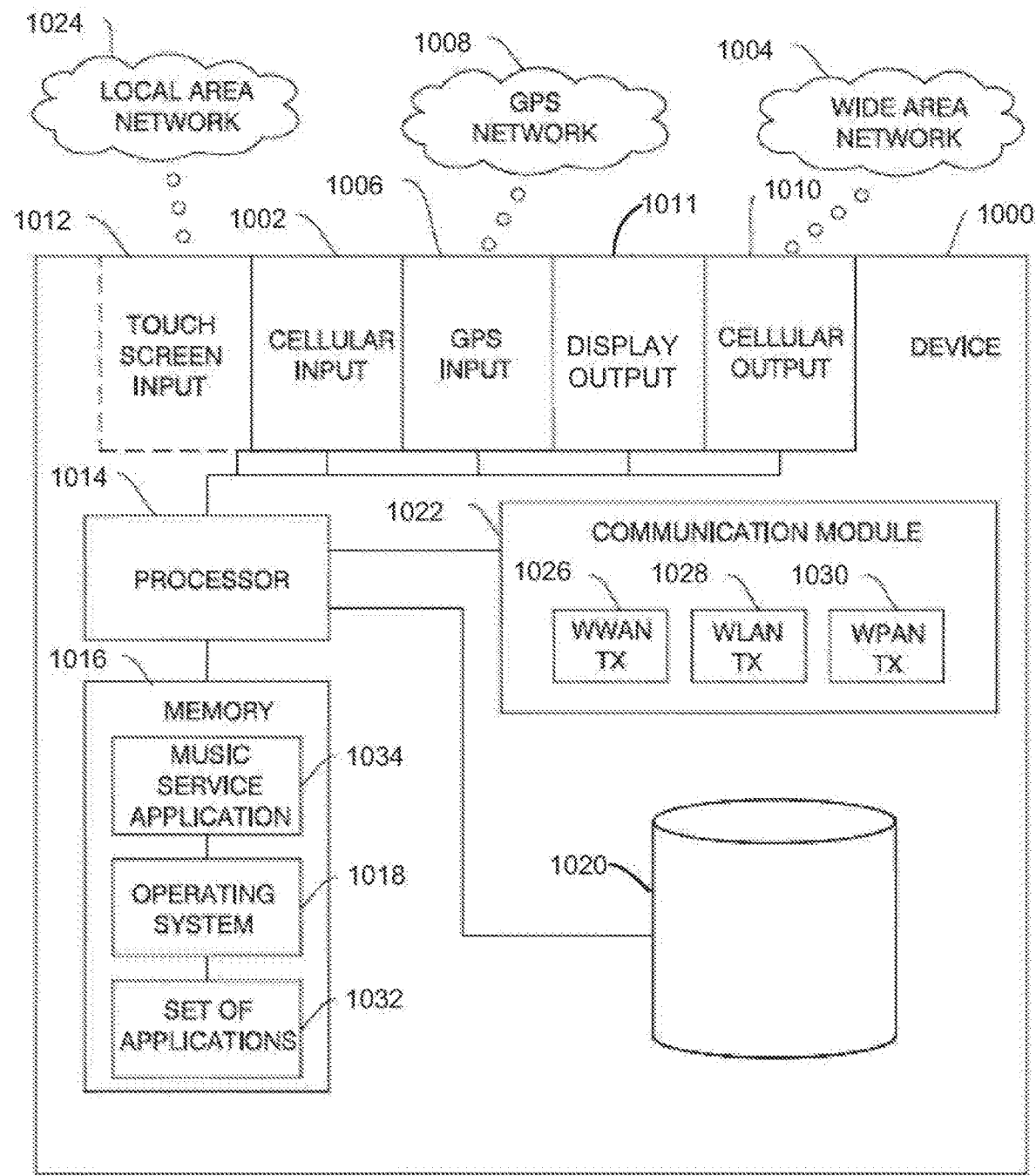
FIG. 10 is a diagram of an exemplary device configured to interface with a music service, in accordance with embodiments.

As shown in FIG. 10, a device 1000, such as the device 104 or the additional devices 110, can comprise a set of ports that can receive input signals or data from, or output signals or data to, other components of a media distribution environment, such as the environment 100 as discussed with respect to FIG. 1. More particularly, a cellular input port 1002 can receive cellular data from a wide area network 1004 (such as various private or public networks), a GPS input port 1006 can receive GPS coordinate data from a GPS network 1008, and a cellular output port 1010 can output data to the wide area network 1004. The device can also comprise a display output port 1011 that can send data to a display (such as, e.g., the display 204) of the device 1000 for displaying graphical user interfaces and other display data. The device 1000 can further comprise an optional touch-screen input port 1012 that can receive contact-based inputs from interactions with a touchscreen by a user operating the device 1000.

The device 1000 can further comprise a processor 1014 communicating with a memory 1016, such as electronic random access memory (RAM), or other forms of transitory or non-transitory computer readable storage mediums, operating under control of or in conjunction with an operating system 1018. In embodiments, the memory 1016 may include a local cache, a system cache, a disk cache, a cache memory, and/or other temporary, local memory. The operating system 1018 can be any commercial, open-source, or proprietary operating system or platform. The processor 1014 can communicate with a database 1020, such as a database stored on a local hard drive. While illustrated as a local database in the device 1000, the database 1020 can be separate from the device 1000.

The processor 1014 can further communicate with a communication module 1022, such as a wired or wireless data connection, which in turn communicates with the wide area network 1004. Further, the communication module 1022 can comprise radio transceivers that communicate with a wireless local area network 1024 or other networks, such as various personal area networks. The communication module 1022 can comprise a WWAN transceiver 1026 capable of communicating with the wide area network 1004, a WLAN transceiver 1028 capable of communicating with the local area network 1024, and a WPAN transceiver 1030 capable of communicating with a personal area network (such as a Bluetooth® network). Although not shown in FIG. 10, the communication module 1022 can further include various components for communicating with a GPS network.

The set of ports 1012, 1002, 1006, 1010 of the device 1000 can use the components of the communication module 1022 to connect to the entities of the environment 100. For example, the cellular input port 1002 can receive streaming song data from the music service server 115 via the WWAN transceiver 1026. The processor 1014 can also communicate with a set of applications 1032 that can be configured to execute control logic and perform data processing to perform the functions and techniques as discussed herein. For example, the set of applications 1032 can comprise a music service application 1034 that can provide the interfaces as described herein, receive inputs from the user, and facilitate the communication of data among the entities of the environment 100. It should be appreciated that other applications 1032 and functionalities thereof are envisioned.

While FIG. 10 illustrates the device 1000 as a standalone system using a combination of hardware and software, the components of the device 1000 can also be implemented as a software application or program capable of being executed by a conventional computer platform. Likewise, the components of the device 1000 can also be implemented as a software module or program module capable of being incorporated in other software applications and programs. In either case, the components of the device 1000 can be implemented in any type of conventional proprietary or open-source computer language.

Figure 11:
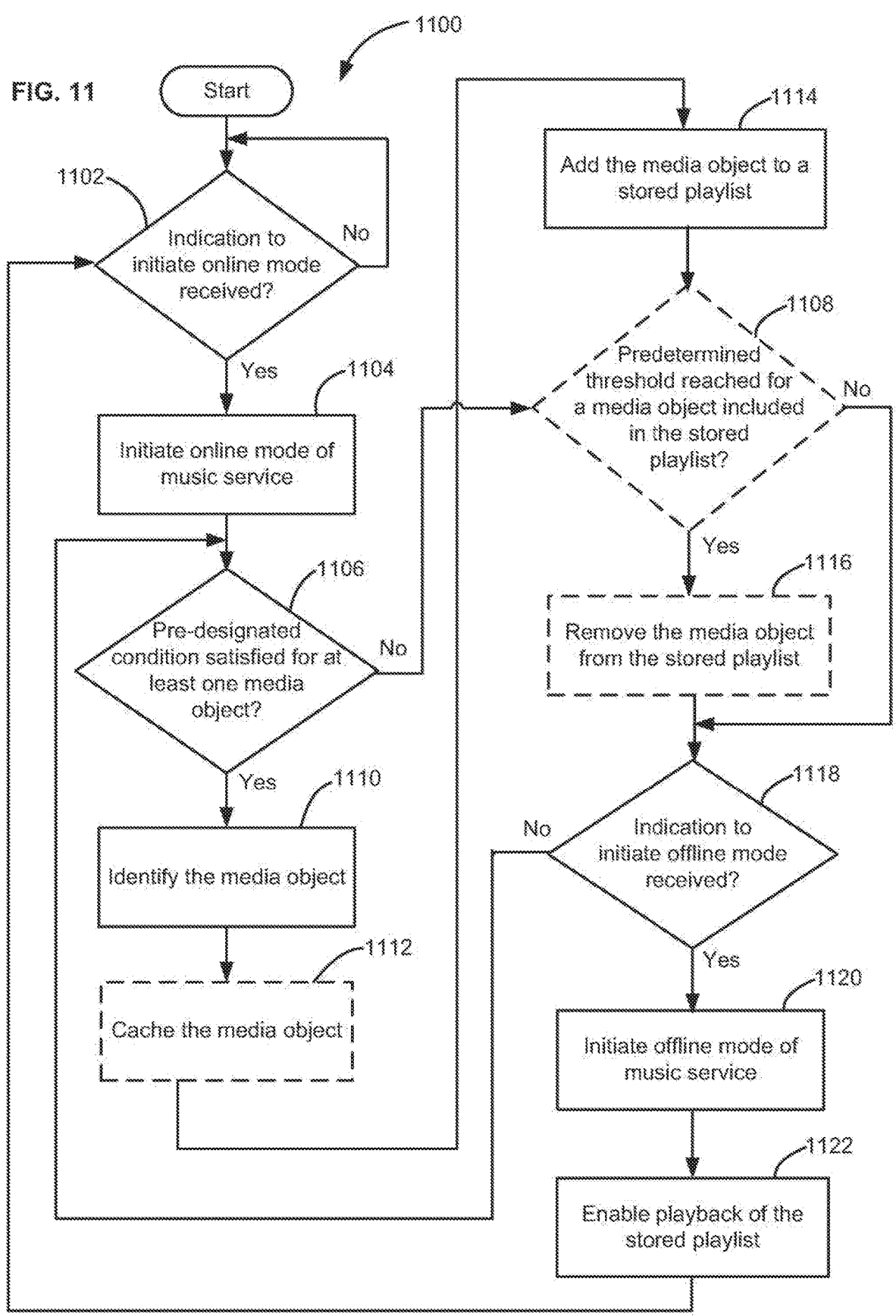
FIG. 11 is a flow diagram depicting playlist generation techniques, in accordance with embodiments.

FIG. 11 is a flowchart of a method 1100 for an electronic device (such as the device 105) to automatically generate a playlist comprising cached music files accessed by a user of a music service. It should be appreciated that the functionalities of the method 1100 can be implemented with the electronic device executing an application and interfacing with a remote server, such as the music service server 115. In embodiments, the application may be the music service application or a portion thereof, such as an automatic playlist generation aspect of the application. In some embodiments, the application may be a computer program stored on a non-transitory computer readable medium that is executable by a processor of the device. Further, according to embodiments, the electronic device includes a display, a user interface (such as the touchscreen 204), a memory (such as the memory 1016), and a processor (such as the processor 1014) communicatively coupled to the display, the user interface, and the memory.

The method 1100 can begin at step 1102 where the processor determines whether an indication to initiate an online mode of the music service application has been received. In embodiments, during the online mode, the device is communicatively coupled to a server affiliated with the music service. If the answer at step 1102 is "no," the method 1100 loops back to step 1102 and waits for the indication to be received. If the answer at step 1102 is "yes," the method 1100 continues to step 1104, where the online mode of the music service application is initiated. At step 1106, the processor determines whether at least one media object accessed by the user through the music service satisfies a pre-designated condition, the at least one media object being included in a plurality of media objects accessible via the music service. In embodiments, the at least one media object includes at least one of a music file, an album, or a playlist. If the answer at step 1106 is "no," the method 1100 continues to step 1108.

If the answer at step 1106 is "yes," the method 1100 continues to step 1110, where the processor identifies the at least one media object as satisfying the pre-designated condition. In some embodiments, the pre-designated condition includes receipt of a playback indication, from a user of the music service, to playback the at least one media object. In one such embodiment, the playback indication may be received within a predetermined time period prior to the identification of the at least one media object, as described herein. In other embodiments, the pre-designated condition includes receipt of an indication, from a user of the music service, to add the at least one media object to a preferred list associated with the user on the music service. In one such embodiment, the preferred indication is received within a predetermined time period prior to the identification of the at least one media object, as described herein. In still other embodiments, the pre-designated condition includes a threshold number of playback requests received in association with the at least one media objet within a predetermined time period, as described herein.

In some embodiments, the method 1100 includes step 1112, where the processor caches or temporarily stores the at least one media object identified at step 1110 in the memory of the device. For example, the step 1112 may be needed if the at least one media object identified at step 1110 is not stored in the memory of the device, specifically in a cache memory of the device. If, on the other hand, the identified media object has already been cached by the processor, the method 1100 will continue from step 1110 to step 1114.

At step 1114, in response to the identification at step 1110, the processor automatically adds the identified media object to a playlist stored in the memory of the device. In embodiments, the playlist includes one or more additional media objects that satisfy the pre-designated condition and are cached in the local memory of the device. In some embodiments, the playlist includes each media object that satisfied the pre-designated condition during a predetermined time period (e.g., within the last week, the last month, etc.)

In some embodiments, the method 1100 includes step 1108, where the processor determines whether a predetermined threshold has been reached for a media object included in the stored playlist. If the answer is "yes," the method 1100 continues to step 1116, where the media object is removed from the stored playlist. If the answer is "no" at step 1108, the method 1100 continues directly to step 1118. In some embodiments, the predetermined threshold is defined by a storage capacity of the memory (e.g., whether a maximum disk space, or a percentage of the available disk space, has been exceeded). In other embodiments, the predetermined threshold is related to a timestamp assigned to the one or more media objects (e.g., whether the timestamp is older than a predetermined time). In some cases, media objects may be removed from the playlist in order of increasing playtime, so that the least played music objects are deleted first. From step 1116, the method 1100 continues to step 1118.

At step 1118, the processor determines whether an indication to initiate an offline mode of the music service application has been received via the user interface of the device. In embodiments, during the offline mode, the device is not communicatively coupled to the server. If the answer at step 1118 is "no," the method 1100 continues back to step 1106 to check whether another media object has been identified. If the answer at step 1118 is "yes," the method 1100 continues forward to step 1120, where the processor initiates the offline mode of the music service application. From step 1120, the method continues to step 1122, where playback of the playlist stored in the memory of the device is enabled. For example, at step 1122, the offline version of the music service application may be presented to the user with an option to play the automatically-generated playlist (e.g., as shown in FIG. 6).

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method for generating a playlist, the method comprising:
   initiating, on a device, an online mode of a music service, wherein while operating in the online mode the device is communicatively coupled to the music service;
   streaming, from the music service, one or more media objects accessed through the music service;
   automatically identifying, by the device during a predetermined time period, one or more additional media objects of the music service as satisfying a pre-designated condition in response to streaming the one or more media objects;
   responsive to the identification, automatically storing the one or more additional media objects to local storage of the device;
   generating, by the device, a playlist accessible in an offline mode comprising the one or more additional media objects;
   detecting initiation of the offline mode of the music service, by the device, wherein while operating in the offline mode the device is not communicatively coupled to the music service; and
   in response to initiating the offline mode, enabling playback of the playlist at the device.

2. The method of claim 1, further comprising:
   upon determining that a predetermined threshold is satisfied, removing one or more of the additional media objects from the playlist, and deleting the one or more of the media objects from the local storage.

3. The method of claim 2, wherein the predetermined threshold is defined by a storage capacity of the local storage.

4. The method of claim 2, wherein the predetermined threshold is related to a timestamp assigned to the one or more additional media objects.

5. The method of claim 1, wherein the one or more additional media objects include at least one of a music file, an album, or a playlist.

6. The method of claim 1, wherein satisfying the pre-designated condition further includes receipt of a playback indication, from a user of the music service, for initiating playback of the one or more additional media objects.

7. The method of claim 6, wherein the playback indication is received within a predetermined time period prior to the identification of the one or more additional media objects.

8. The method of claim 1, wherein the pre-designated condition further includes a threshold number of playback requests received in association with the one or more additional media objects within a second predetermined time period.

9. A non-transitory computer readable medium comprising computer readable code for generating a playlist, the computer readable code executable by one or more processors to:
   initiate, on a device, an online mode of a music service, wherein while operating in the online mode the device is communicatively coupled to the music service;
   stream, from the music service, one or more media objects accessed through the music service;
   automatically identify, by the device during a predetermined time period, one or more additional media objects of the music service as satisfying a pre-designated condition in response to streaming the one or more media objects;
   responsive to the identification, automatically store the one or more additional media objects to local storage of the device;
   generate, by the device, a playlist accessible in an offline mode comprising the one or more additional media objects;
   detect initiation of the offline mode of the music service, by the device, wherein while operating in the offline mode the device is not communicatively coupled to the music service; and
   in response to initiating the offline mode, enable playback of the playlist at the device.

10. The non-transitory computer readable medium of claim 9, further comprising computer readable code to:
    upon determining that a predetermined threshold is satisfied, remove one or more of the additional media objects from the playlist, and deleting the one or more of the media objects from the local storage.

11. The non-transitory computer readable medium of claim 10, wherein the predetermined threshold is defined by a storage capacity of the local storage.

12. The non-transitory computer readable medium of claim 10, wherein the predetermined threshold is related to a timestamp assigned to the one or more additional media objects.

13. The non-transitory computer readable medium of claim 9, wherein the one or more additional media objects include at least one of a music file, an album, or a playlist.

14. The non-transitory computer readable medium of claim 9, wherein the pre-designated condition further includes receipt of a playback indication, from a user of the music service, for initiating playback of the one or more additional media objects.

15. The non-transitory computer readable medium of claim 14, wherein the playback indication is received within a predetermined time period prior to the identification of the one or more additional media objects.

16. The non-transitory computer readable medium of claim 9, wherein the pre-designated condition further includes a threshold number of playback requests received in association with the one or more additional media objects within a second predetermined time period.

17. A system for generating a playlist, comprising:
one or more processors;
one or more computer readable media coupled to the one or more processors and comprising computer readable code executable by the one or more processors to:
initiate, on a device, an online mode of a music service, wherein while operating in the online mode the device is communicatively coupled to the music service;
stream, from the music service, one or more media objects accessed through the music service;
automatically identify, by the device during a predetermined time period, one or more additional media objects of the music service as satisfying a pre-designated condition in response to streaming the one or more media objects;
responsive to the identification, automatically store the one or more additional media objects to local storage of the device;
generate, by the device, a playlist accessible in an offline mode comprising the one or more additional media objects;
detect initiation of the offline mode of the music service, by the device, wherein while operating in the offline mode the device is not communicatively coupled to the music service; and
in response to initiating the offline mode, enable playback of the playlist at the device.

18. The system of claim 17, further comprising computer readable code to:
upon determining that a predetermined threshold is satisfied, remove one or more of the additional media objects from the playlist, and deleting the one or more of the media objects from the local storage.

19. The system of claim 17, wherein the one or more additional media objects include at least one of a music file, an album, or a playlist.

20. The system of claim 17, wherein the pre-designated condition further includes receipt of a playback indication, from a user of the music service, for initiating playback of the one or more additional media objects.

\* \* \* \* \*